United States Patent [19]

Martin

[11] Patent Number: 4,627,467

[45] Date of Patent: Dec. 9, 1986

[54] PILOT OPERATED DIRECTIONAL CONTROL VALVE

[75] Inventor: Eugene J. Martin, Portage, Mich.

[73] Assignee: Pneumo Corporation, Boston, Mass.

[21] Appl. No.: 790,808

[22] Filed: Oct. 25, 1985

Related U.S. Application Data

[63] Continuation of Ser. No. 402,741, Jul. 28, 1982, abandoned.

[51] Int. Cl.4 ........................ F16K 35/00; F15B 13/42

[52] U.S. Cl. ............................ 137/625.6; 137/625.27; 137/625.66; 251/32

[58] Field of Search ................. 251/28, 32; 137/625.6, 137/624.27, 625.66; 91/461

[56] References Cited

U.S. PATENT DOCUMENTS

| | | | |
|---|---|---|---|
| 3,188,149 | 6/1965 | Pekril | 137/625.27 X |
| 3,230,841 | 1/1966 | York | 137/625.66 X |
| 3,465,649 | 9/1969 | Eggers et al. | 137/624.27 X |
| 3,519,019 | 7/1970 | Rieschel | 137/625.6 |
| 3,540,480 | 11/1970 | Leibfritz | 137/625.6 |
| 3,568,717 | 3/1971 | Plate | 137/624.27 |
| 3,618,984 | 11/1971 | Coolz | 137/624.27 X |
| 3,640,146 | 2/1972 | Barnes | 137/624.27 X |
| 3,746,401 | 7/1973 | Stearns | 137/624.27 X |
| 3,776,101 | 12/1973 | Nussbaumer | 137/625.6 X |
| 3,805,670 | 4/1974 | Fallows | 91/378 |
| 3,866,880 | 2/1975 | Schexnayder | 137/624.27 X |
| 3,935,792 | 2/1976 | Dezelan et al. | 91/461 X |
| 3,939,870 | 2/1976 | Giugliano | 137/625.6 X |
| 4,007,666 | 2/1977 | Bauer et al. | 91/446 |
| 4,263,938 | 4/1981 | Peters | 137/625.66 X |
| 4,461,449 | 7/1984 | Turner | 251/62 |

FOREIGN PATENT DOCUMENTS

| | | | |
|---|---|---|---|
| 1253541 | 6/1964 | Fed. Rep. of Germany | 137/624.47 |
| 990046 | 4/1965 | United Kingdom | 137/625.66 |
| 2095794 | 10/1982 | United Kingdom | 137/625.6 |

*Primary Examiner*—Larry Jones
*Assistant Examiner*—Carl D. Price
*Attorney, Agent, or Firm*—Renner, Otto, Boisselle & Lyon

[57] ABSTRACT

Directional control valve includes a manually operated pilot valve stage and a hydraulically operated power valve stage to isolate the pilot valve stage from the effects of the high axial flows passing through the power valve stage. The pilot valve is spring loaded in the stow direction as long as the directional control valve is disconnected from system pressure. Such spring also acts as a stowed condition linkage pre-tensioner to avoid fretting of various parts during vibration conditions and the like. When system pressure is applied to the directional control valve, such preload is automatically removed from the pilot valve for ease of movement between the stow and deploy positions by a relatively low manual input rotary force.

20 Claims, 5 Drawing Figures

PILOT OPERATED DIRECTIONAL CONTROL VALVE

This application is a continuation, of application Ser. No. 402,741, filed 7-28-82, now abandoned.

DISCLOSURE

This invention relates to a pilot operated directional control valve, and more particularly, to a directional control valve including a small manually operated pilot valve stage and a hydraulically operated power valve stage.

The directional control valve of the present invention may be used for example to actuate the thrust reverser actuators for a jet engine of an aircraft to provide for reverse thrust of the engine. In accordance with the present invention, the flow control valve utilizes two stages to isolate the pilot valve from the effects of the high axial flows passing through the power valve. A relatively low rotary input signal is all that is needed to position the pilot valve for either pressurizing or venting the signal end of the power valve. When system pressure is ported to the signal end of the power valve, the power valve moves to the deploy position for connecting system pressure to the extend side of the actuators, whereas when the signal end is vented, system pressure acting on the unbalanced area adjacent the opposite end of the power valve will produce the large chip shear forces needed to ensure return of the power valve to the stow position connecting the actuators to return.

Further in accordance with this invention, the power valve completely closes off the return port before opening the pressure port to prevent porting of the pressure directly to return during valve cycling.

Also in accordance with this invention, a small spring holds the power valve plunger in its stowed position when the signal end of the power valve is connected to return.

Still further in accordance with this invention, the pilot valve is spring loaded in the stow direction when the system pressure is disconnected from the directional control valve. Such spring also acts as a stowed condition linkage pre-tensioner to avoid fretting of the input linkage to the pilot valve during vibration conditions and the like.

In accordance with another aspect of this invention, the preload on the pilot valve is automatically removed when the system pressure to the directional control valve is re-established so that a relatively low rotary input signal is all that is necessary to move the pilot valve from the stow position to the deploy position and return.

In accordance with a further aspect of the invention, both ends of the pilot valve plunger may be open to return to avoid pressure unbalances on the pilot valve.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
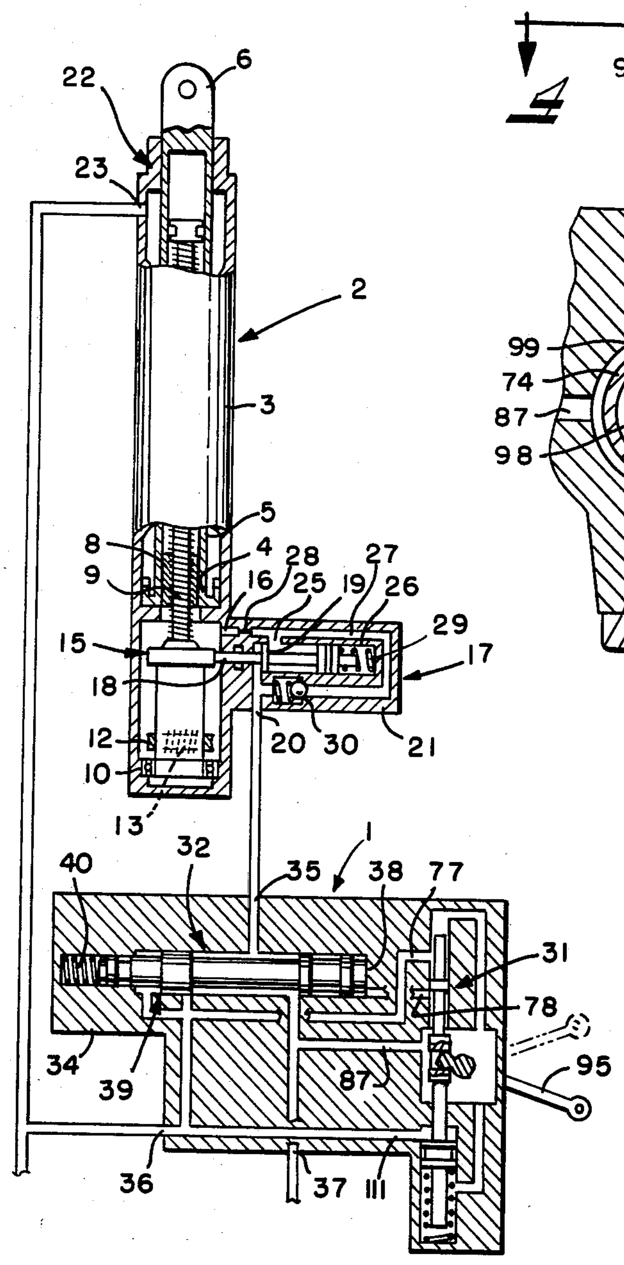
FIG. 1 is a schematic illustration of the flow control valve of the present invention shown connected to a fluid actuator.

Referring now in detail to the drawing and initially to FIG. 1 thereof, a pilot operated directional control valve 1 in accordance with the invention is schematically shown connected to a fluid actuator 2. Such actuator may be used for example to actuate the thrust reversers for a jet engine of an aircraft to provide for reverse thrust of the engine to assist in braking of the aircraft, and includes a cylinder 3 containing a piston 4 axially movable therein. Attached to the piston is a hollow rod 5 which extends through the rod end of the cylinder and has a rod end assembly 6 on its outboard end to facilitate connection to the movable part of the device to be actuated. A suitable trunnion mount may also be provided on the cylinder to facilitate connection to the other part of the device to be actuated.

Attached to the center of the piston is a high lead Acme nut 8 which may be coupled to a mating Acme screw shaft 9. One end of the screw shaft is shown journaled in suitable bearings 10 within the actuator housing, whereas the other end extends into the hollow piston rod a substantial distance beyond the nut. As the piston moves back and forth in the cylinder, the screw shaft rotates at a speed proportional to the velocity of the piston.

The screw shaft may have a high lead worm wheel 12 attached thereto which mates with a worm shaft 13 mounted for rotation within a transverse bore in the actuator housing. When the actuator is in the retracted or stowed position shown in FIG. 1, such actuator may be locked in such position by a suitable lock mechanism 15. The details of such lock mechanism are not shown, but may, for example, be of the type disclosed in copending U.S. application Ser. No. 352,046, filed Feb. 24, 1982, now U.S. Patent No. 4,463,657 the disclosure of which is incorporated herein by reference.

Before the actuator can be extended, the associated lock mechanism must be released and then system pressure must be supplied to the extend port 16 of the actuator. Preferably, both such functions are accomplished by actuation of a sequence-power valve 17 which may also be of the type disclosed in the aforementioned copending application. As schematically illustrated in FIG. 1, such sequence-power valve includes a lock release lever 18 which, when in the position shown, permits the lock mechanism 15 to perform its normal locking function when the locking actuator piston 4 reaches its fully retracted position. To release the lock mechanism, a lock piston 19 is provided which is responsive to fluid pressure being supplied to a lock-in port 20 in the sequence-power valve housing 21 to cause the lock release lever 18 to move to a lock disengaging position.

When the pilot requires deployment of the thrust reversers, system pressure is first admitted to the retract end 22 of the actuator through a retract port 23 to remove any axial tension loads on the actuator which might otherwise interfere with release of the lock. The actuator will remain in the stowed position until the pilot activates the directional control valve 1 to supply system pressure to the lock-in port 20 as described hereafter.

As schematically illustrated in FIG. 1, such directional control valve consists of two stages, a small manually operated pilot valve stage 31 and a hydraulically operated power valve stage 32, both of which may be contained in a common housing 34. The housing includes an outlet port 35 adapted to be connected to the lock-in port 20 of the sequence-power valve 17 and pressure and return ports 36, 37, either of which may be connected to the outlet port 35 depending on the position of the power valve 32. When the power valve is in the right-most or stow position shown in FIG. 1, communication between the outlet port 35 and pressure port 36 is blocked by the power valve and communication between such outlet port and the return port 37 is established through the power valve. Conversely, when the power valve 32 is moved to the left to the deploy position, the return port 37 is closed off and the pressure port 36 is connected to the outlet port through the power valve.

The position of the power valve is controlled by the pilot valve 31 which may be manually moved between the stow position shown in FIG. 1 and a deploy position. With the pilot valve in such stowed position, the right or signal end 38 of the power valve 32 is vented to the return port 37 through the pilot valve, whereby the system pressure acting on the unbalanced area 39 at the left end of the power valve will cause the power valve to move to the right to the stowed position shown. A small spring 40 acting on the left end of the power valve will retain the power valve in the stowed position as long as the signal end of the power valve is connected to return. However, when the pilot valve is moved downwardly to its deploy position, the signal end of the power valve is connected to the pressure port 36 through the pilot valve, which causes the power valve to move to the left to the deploy position.

The advantage in using a pilot valve to control such power valve movements is that a relatively low input force, for example, in the range of one inch pound torque on a short lever is all that is necessary to move the pilot valve from the stow position to the deploy position or vice versa. Also, by using two stages, the pilot valve is isolated from the effects of the high axial flow forces that normally act on the power valve during extension of the actuator.

When the power valve is in the deploy position, the system pressure that is supplied to the the pressure port 36 will be ported to the lock-in port 20 through the power valve 32, which causes the lock piston 19 to move the lock release lever 18 out of engagement with the lock mechanism 15 to release the lock. After the lock piston has moved far enough to release the lock mechanism, the system pressure acting on the lock piston is ported to the extend end of the actuator through a port 25 in the lock piston bore 26 which is uncovered by the lock piston following such movement. Port 25 communicates with the actuator extend port 16 through an extend passage 27 in the sequence-power valve housing 21. Since the area of the piston 4 exposed to the extend pressure is greater than that exposed to the retract pressure, the actuator will extend. An extend orifice 28 may be provided in the extend passage 27 to prevent the external pressure at the lock-in port 20 from dropping below a predetermined level so that the lock piston 19 will not cycle during extension of the actuator.

To retract the actuator, the pressure acting on the extend end of the actuator is reduced by moving the pilot valve 31 to the stow position shown in FIG. 1. This vents the signal end 38 of the power valve in the manner previously described, whereby the system pressure acting on the unbalanced area 39 at the opposite end of the power valve will cause the power valve once again to move to the stow position connecting the lock-in port 20 to the return port 37. With reduced pressure at the lock-in port, a return spring 29 acting on the lock piston 19 will cause the lock piston to return to its original position blocking fluid flow form the extend end of the actuator through the lock piston bore 26. However, return flow from the extend end of the actuator still occurs through a check valve 30 in the passage 27 providing communication between the extend end of the actuator and the lock-in port.

With the lock piston 19 in its extended position shown in FIG. 1, the lock release lever 18 will no longer be effective in maintaining the lock mechanism 15 in the unlocked condition. However, the construction of the lock mechanism is such that it will remain unlocked until the actuator piston is moved to the fully stowed position by the system pressure acting on the retract end of the actuator and the actuator bottoms out as more fully described in the aforementioned copending application.

Figure 2:
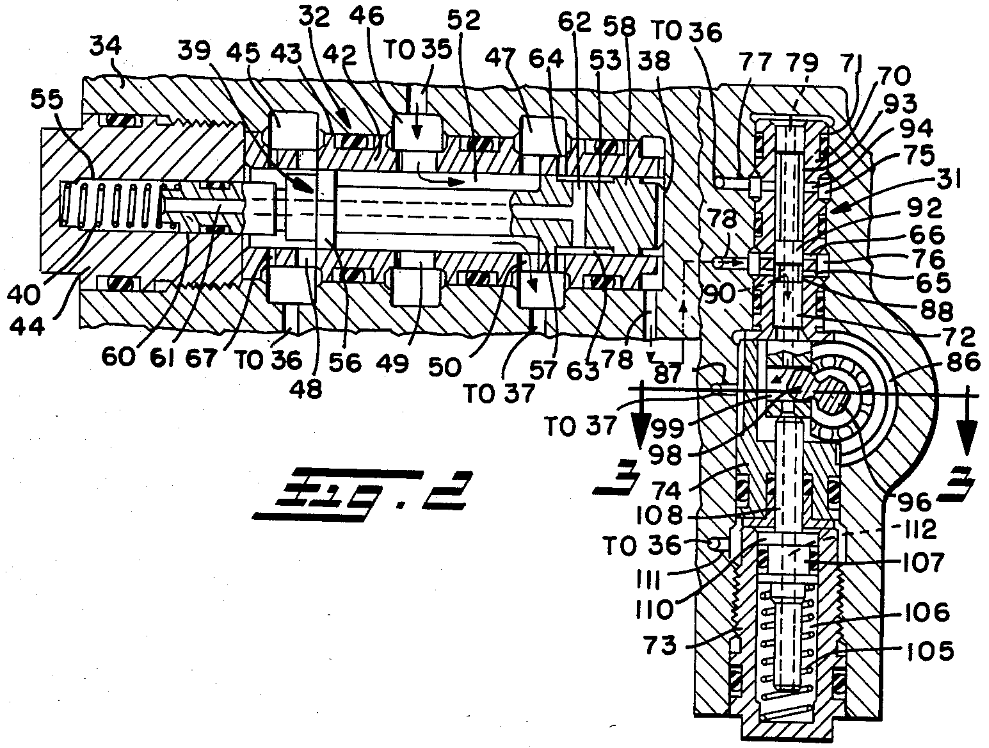
FIG. 2 is an enlarged fragmentary longitudinal section through a preferred form of such flow control valve in which both the pilot stage and power stage are shown in their respective stowed positions.
Figure 5:
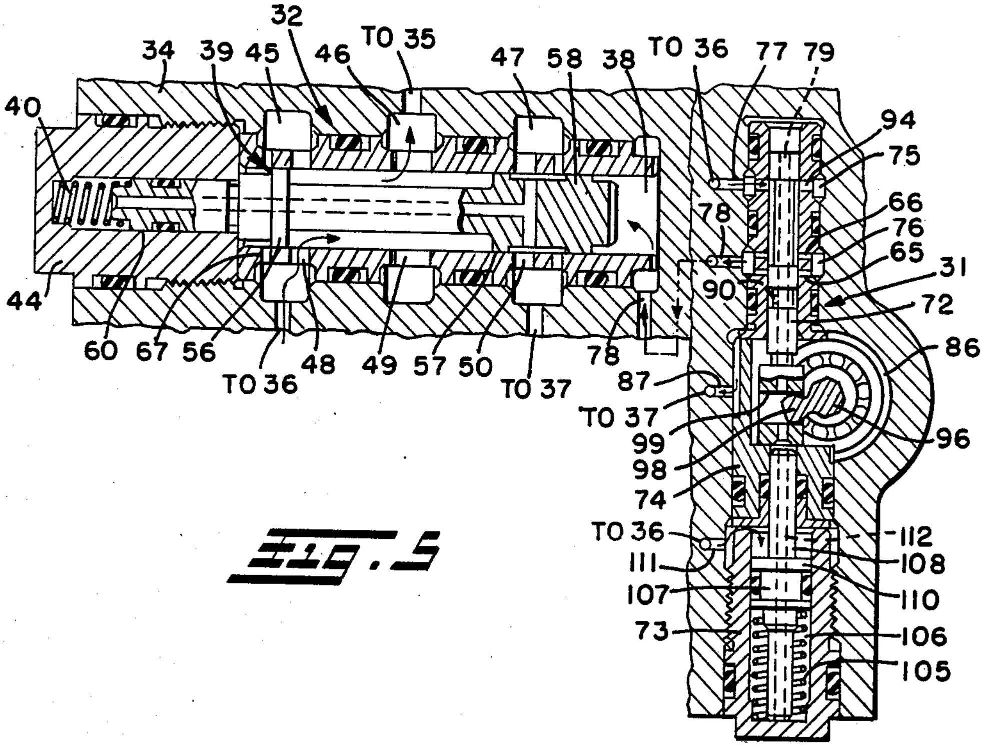
FIG. 5 is an enlarged fragmentary longitudinal section through the directional control valve, similar to FIG. 2, but showing both the pilot valve and power valve in the respective deployed positions.

The details of a preferred embodiment of such directional control valve 1 are shown in FIGS. 2 and 5. The power valve 32 includes a porting sleeve 42 contained within a bore 43 extending into the valve housing 34 from one side thereof and retained in place as by an end cap retainer 44 having a threaded connection with the outer end of the bore wall. The bore 43 has three axially spaced apart annular grooves 45, 46, 47 respectively in communication with the pressure port 36, outlet port 35, and return port 37 through associated passages in the valve housing. A plurality of external seals in the porting sleeve isolate the annular grooves 45–47 from each other except through longitudinally spaced passages 48, 49, 50 and a central passage 52 in the porting sleeve.

Axially movable within the central passage 52 in the porting sleeve 42 is a power valve plunger 53. The power valve plunger 53 is normally held in its right-most stow position shown in FIG. 2 by a light spring 40 acting on the opposite or left end of the power valve plunger. Preferably, such left end is of reduced diameter and extends into a cylindrical recess 55 in the end cap retainer 44, with the spring 40 interposed between the bottom of the recess and a shoulder adjacent the left end of the power valve plunger.

A pair of axialy spaced apart lands 56, 57 on the power valve plunger alternately block and establish communication between the outlet port 35 and one or the other ports 36, 37 depending on the position of the power valve plunger. When the power valve plunger is in the fully stowed position shown in FIG. 2, communication between the outlet port and pressure port 36 is blocked by the land 56, while the land 57 unblocks communication between the outlet port and return port 37. Also when in such stow position, the right or signal end 38 of the power valve plunger bore 43 is vented to such return port 37 through the pilot valve 31 as described hereafter.

Preferably, only the reduced end of the power valve plunger which extends into the recess 55 in the end cap retainer 44 is provided with a dynamic seal 60 to keep the valve actuating forces as low as possible. A build up of fluid pressure or cavitation within the recess 55 is prevented by continuously venting the recess to the return port 37 through longitudinal and radial passages 61, 62 and an annular groove 63 in the power valve plunger adjacent the right side of the land 57 which communicates with the porting groove 47 through radial passages 64 in the porting sleeve. An additional land 58 on the power valve plunger adjacent the inner end thereof isolates the signal end of the power valve bore from the annular groove 63.

When it is desired to deploy the actuator, the pilot valve 31 is moved to the deploy position shown in FIG. 5 which closes off the return port 65 of the pilot and connects the signal end 38 of the power valve to the pressure port 66 of the pilot. This causes the power valve plunger to move to the left to its deploy position also shown in FIG. 5. During such movement, the land 57 completely closes off communication between the outlet port 35 and return port 37 before the land 56 opens communication between such outlet port and pressure port 36. In this way, the porting of pressure directly from the pressure port to the return port through the power control valve during valve cycling is prevented.

Because the inner end of the power valve plunger has a relatively large diameter, a relatively small flow of high pressure fluid from the pilot valve to the signal end of the power valve bore will generate sufficiently large chip shear forces on the power valve plunger to ensure its movement to the unlock/deploy position when the pilot valve is moved to the deploy position. Similarly, when the pilot valve is moved to the stow position to connect the signal end of the power valve bore to return, the large chip shear forces needed to ensure return of the power valve to the stow position are obtained by the system pressure acting on the unbalanced area 39 at the outer end of the power valve plunger through additional radial passages 67 in the porting sleeve 42. Of course, such unbalanced area 39, being smaller than the area of the inner end of the power valve plunger, will not interfere with movement of the power valve to the deploy position when the signal end of the power valve bore is pressurized as aforesaid.

The pilot valve 31 includes a pilot valve sleeve 70 received within another bore 71 which may extend into the housing 34 from another side thereof. Axially movable within the pilot valve sleeve is a pilot valve plunger 72. The pilot valve sleeve is retained within the bore as by a pilot valve retainer 73 threadedly received in the outer end of the bore and a valve stop spacer 74 interposed therebetween. The valve stop spacer also provides the additional function of limiting movement of the pilot valve plunger 72 in the deploy direction.

The pilot valve sleeve has a pair of axially spaced apart annular grooves 75, 76, of which groove 75 communicates with the pressure port 36 through a passageway 77 in the housing, and the other groove 76 communicates with the signal end 38 of the power valve bore 43 through another passageway 78 in the housing.

When the pilot valve plunger is in the stow position shown in FIG. 2, communication between the signal end of the power valve bore and the return port 37 is established through an axial bore 79 in the pilot valve plunger. The axial bore desirably extends all the way through the pilot valve plunger so that both ends are open to return to avoid undesirable pressure unbalances from acting on the pilot valve plunger. The outer end of the pilot valve plunger extends into an enlarged chamber 86 within the valve housing which is maintained at return pressure by another passageway 87 in the housing communicating with the return port 37. An annular groove 88 in the pilot valve plunger communicates with the axial bore 79 through radial passages 90 therein, and such annular groove 88 in turn communicates with the groove 76 in the pilot valve sleeve through the return port 65 in the pilot valve sleeve when the pilot valve plunger is in such stow position as aforesaid.

When the pilot valve plunger is moved to the deploy position up against the valve stop spacer 74 as shown in FIG. 5, a land 92 on the pilot valve plunger closes off communication betwen the axial bore 79 in the pilot valve plunger and signal end of the power valve bore, following which supply pressure is ported to such signal end through another annular groove 93 in the pilot valve plunger which receives system pressure from the pressure port 36 through radial passages 94 in the pilot valve sleeve.

Figure 3:
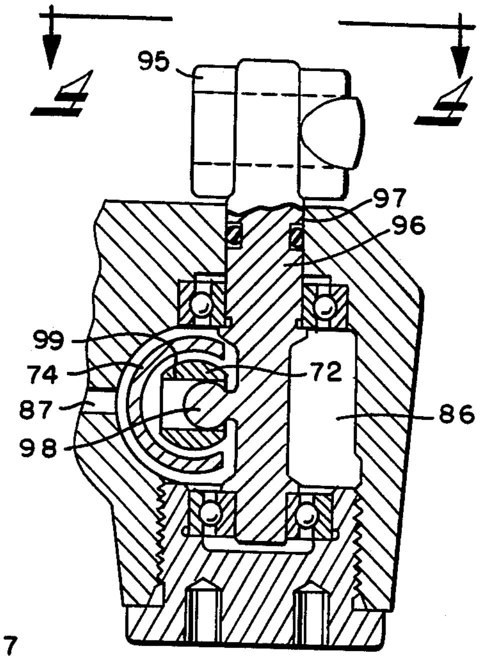
FIG. 3 is an enlarged fragmentary transverse section through the pilot valve of FIG. 2 as seen from the plane of the line 3—3 thereof, showing the manual rotary input drive to the pilot valve plunger.
Figure 4:
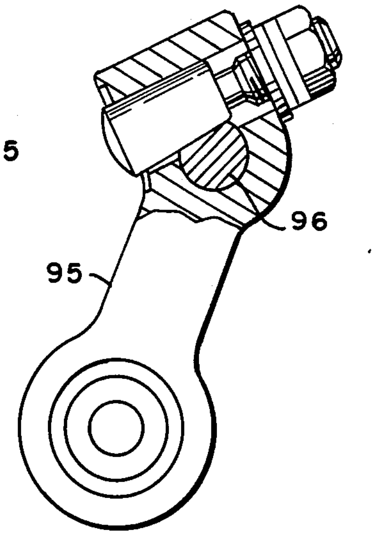
FIG. 4 is a side elevation view partly in section of the input lever for the pilot valve as seen from the plane of the line 4—4 of FIG. 3.

Linear movement of the pilot valve plunger is obtained by applying a rotary signal to an input arm 95, shown in FIGS. 3 and 4. Such input arm may have a nominal travel, for example 30°, and may have a relatively short length, for example $1\frac{1}{4}$ to $1\frac{1}{2}$ inch, since a relatively low input force, such as one inch pound torque, is all that is required to move the pilot valve plunger from the stow position to the deploy position or vice versa. The input arm is attached to one end of an input shaft 96 which may be journal mounted within a transverse bore 97 intersecting the enlarged chamber 86. The input shaft may have a ball joint 98 thereon for receipt in a transverse slot 99 in the outer end of the pilot valve plunger, whereby rotation of the input shaft causes axial movement of the pilot valve plunger within the sleeve 70.

Until such time as system pressure is supplied to the pressure port 36, the pilot valve plunger is preferably spring loaded in the stow position as by a preload spring 105 contained in a central recess 106 in the pilot valve retainer 73. The spring 105 may act directly against the adjacent end of the pilot valve plunger, but preferably acts through a preload piston 107 urging a rod extension 108 thereon into engagement with the outer end of the pilot valve plunger. Such spring mechanism not only provides a spring load on the pilot valve while in the stow position, but also acts as a stowed condition linkage pre-tensioner to avoid fretting of the input linkage to the pilot valve during vibration conditions and the like during such time as the directional control valve is inactive and system pressure is not being supplied to the pressure port 36.

When the pilot requires deployment of the thrust reverser actuators, system pressure is connected to the pressure port 36 at the same time that system pressure is admitted to the retract end of the actuator through the retract port 23 to remove any axial tension loads on the actuator which might otherwise interfere with release of the lock 15 as aforesaid. As soon as the pressure port 36 is pressurized, such pressure immediately acts on a land 110 on the preload piston 107 through a passageway 111 in the housing to cause the preload piston to move away from the pilot valve plunger to remove the preload therefrom. A longitudinal bore 112 may extend all the way through the preload piston to vent the inner end of the retainer recess 106 to return. With the preload removed, the pilot valve plunger is free to be moved from the stow position to the deploy position and return to deploy and return the power valve to the stow position in the manner previously described.

Although the invention has been shown and described with respect to a certain preferred embodiment, it is obvious that equivalent alterations and modifications will occur to those skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A valve mechanism comprising a manually operated pilot valve stage and a hydraulically operated power valve stage, means for communicating fluid to and from said pilot valve stage and said power valve stage by connecting each of said pilot valve stage and said power valve stage to a fluid pressure source and to a fluid return means, said pilot valve stage including a manually movable pilot valve plunger movable between second and first positions for respectively providing a signal pressure to said power valve stage when said pilot valve stage is connected to such fluid pressure source and for venting said signal pressure to said fluid return means, spring means for providing a preload force on said pilot valve plunger urging said pilot valve plunger toward said first position when said pilot valve stage is disconnected from such fluid pressure source, and means for removing said spring means preload force in response to fluid pressure being supplied to said pilot valve stage, said power valve stage including a signal end to which such signal pressure is respectively supplied and vented by said pilot valve stage through passage means in said power valve stage and pilot valve stage during such movements of said pilot valve plunger between said second and first positions as aforesaid, said power valve stage including a power valve plunger responsive to the pressurizing and venting of said signal end to cause movement of said power valve plunger between two different porting positions for respectively connecting an outlet port in said power valve stage to a pressure port which is directly connected to said fluid pressure source and to a return port which is directly connected to said fluid return means, said power valve plunger having one end exposed to said signal end, whereby when a signal pressure is supplied to said signal end, said signal pressure acting on said one end of said power valve plunger causes said power valve plunger to move to one of said porting positions, and another end of said power valve plunger having a differential area smaller than said one end of said power valve plunger, said differential area on said powre valve plunger being exposed to the fluid pressure source which is directly connected to said pressure port, whereby when said signal end is vented, the fluid pressure source which is directly connected to said pressure port acting on said differential area on said another end of said power valve plunger causes said power valve plunger to move to another of said porting positions.

2. The valve mechanism of claim 1 further comprising manual input lever means connected to said pilot valve plunger for effecting such movements thereof, said spring means also being operative to provide a pretension force to said input lever means when said valve mechanism is disconnected from such fluid pressure source to eliminate fretting of said input lever means during vibration conditions and the like while said valve mechanism is inactive.

3. The valve mechanism of claim 2 wherein said input lever means is connected to an input shaft for limited rotation of said input shaft by said input lever means, and means are provided for causing axial movement of said pilot valve plunger between said second and first positions in response to such rotational movements of said input shaft in opposite directions.

4. The valve mechanism of claim 3 wherein said means for causing axial movement of said pilot valve plunger comprises a ball joint on said input shaft, and a transverse slot in said pilot valve plunger in which said ball joint is received.

5. The valve mechanism of claim 1 further comprising a housing, said pilot valve plunger being movable in a pilot valve sleeve contained in a bore in said housing, said pilot valve sleeve being retained against movement in said bore by a pilot valve retainer threadedly received in an outer end of said bore, said pilot valve retainer including a central recess in which said spring means is received.

6. The valve mechanism of claim 5 further comprising a preload piston in said central recess in said pilot valve retainer, said preload piston being interposed between said spring means and said pilot valve plunger, said preload piston having a rod extension thereon which is urged into engagement with an outer end of said pilot valve plunger by said spring means when said pilot valve stage is disconnected from such fluid pressure source as aforesaid.

7. The valve mechanism of claim 6 wherein said means for removing said spring means preload force comprises said preload piston which is acted upon by such fluid pressure when such fluid pressure is supplied to said valve mechanism to move said preload piston away from said pilot valve plunger against the bias of said spring means.

8. The valve mechanism of claim 5 further comprising a valve stop spacer interposed between said pilot valve sleeve and said pilot valve retainer, said valve stop spacer and pilot valve plunger having shoulder portions thereon that engage for limiting movement of said pilot valve plunger in the direction of said second position.

9. The valve mechanism of claim 1 further comprising spring means acting on said another end of said power valve plunger for retaining said power valve plunger in such another porting position as long as the signal end of said power valve stage is vented.

10. The valve mechanism of claim 9 further comprising a housing, said pilot valve plunger being axially movable in a porting sleeve contained in a bore in said housing, said porting sleeve being retained in said bore by an end cap retainer having a threaded connection with an outer end of said bore.

11. The valve mechanism of claim 10 further comprising a reduced diameter extension on said other end of said power valve plunger, said end cap retainer including a cylindrical recess into which said extension extends in sliding sealed engagement with said cylindrical recess.

12. The valve mechanism of claim 11 wherein only the extension of said power valve plunger includes a dynamic seal to minimize the power valve plunger actuating forces.

13. The valve mechanism of claim 11 wherein said spring means is interposed between a bottom of said recess and said extension.

14. The valve mechanism of claim 1 wherein said pilot valve and power valve stages are contained in a common housing having separate passages for connecting both said pilot valve stage and said power valve stage to said fluid pressure source and said fluid return means, and another passage leading from said pilot valve stage to said signal end of said power valve stage for selectively connecting said signal end either to said fluid pressure source or said fluid return means through said pilot valve stage.

15. The valve mechanism of claim 14 wherein said pilot valve plunger has opposite ends in communication with said fluid return means to avoid pressure unbalances on said opposite ends of said pilot valve plunger.

16. The valve mechanism of claim 15 further comprising a passageway extending all the way through said pilot valve plunger for connecting both ends of said pilot valve plunger to return.

17. The valve mechanism of claim 14 wherein said power valve stage includes means for completely closing off communication to return before opening communication to such fluid pressure source to prevent porting of such fluid pressure directly to return through said power valve stage during cycling of said power valve plunger.

18. The valve mechanism of claim 1 wherein said power valve stage includes means for respectively connecting said outlet port in said power valve stage to said pressure port and to said return port upon movement of said power valve plunger to said porting positions, and means for completely closing off communication between said outlet port and said return port before opening communication between said outlet port and said pressure port to prevent porting of such fluid pressure directly from said pressure port to said return port through said power control valve during cycling of said power valve plunger.

19. The valve mechanism of claim 18 further comprising spring means acting on said power valve plunger for retaining said power valve plunger in said another porting position as long as said siginal end of said power valve stage is vented.

20. The valve mechanism of claim 1 wherein said pilot valve plunger has opposite ends in communication with said fluid return means to avoid pressure unbalances on said opposite ends of said pilot valve plunger.

* * * * *